(12) United States Patent
Kim et al.

(10) Patent No.: US 12,493,949 B2
(45) Date of Patent: Dec. 9, 2025

(54) SYSTEM AND METHOD FOR AUTOMATIC VEHICLE BODY SANDING

(71) Applicants: HYUNDAI MOTOR COMPANY, Seoul (KR); KIA CORPORATION, Seoul (KR); CMES Inc., Seoul (KR)

(72) Inventors: BeomChul Kim, Hwaseong-si (KR); Tae Sic Kang, Seoul (KR); Kyung Mo Jang, Seoul (KR); Yohan Kim, Seongnam-si (KR); Sungho Lee, Seoul (KR); Myoungjin Seo, Seoul (KR); Sunghee Cheon, Incheon (KR)

(73) Assignees: HYUNDAI MOTOR COMPANY, Seoul (KR); KIA CORPORATION, Seoul (KR); CMES Inc., Seoul (KR)

( * ) Notice: Subject to any disclaimer, the term of this patent is extended or adjusted under 35 U.S.C. 154(b) by 667 days.

(21) Appl. No.: 17/899,980

(22) Filed: Aug. 31, 2022

(65) Prior Publication Data
US 2023/0298157 A1 Sep. 21, 2023

(30) Foreign Application Priority Data
Mar. 18, 2022 (KR) .................. 10-2022-0033749

(51) Int. Cl.
*G06T 7/00* (2017.01)
*B24B 7/10* (2006.01)
*B24B 51/00* (2006.01)

(52) U.S. Cl.
CPC .............. *G06T 7/001* (2013.01); *B24B 7/10* (2013.01); *B24B 51/00* (2013.01); *G06T 2200/04* (2013.01); *G06T 2207/30156* (2013.01)

(58) Field of Classification Search
CPC ................ G06T 7/001; G06T 2200/04; G06T 2207/30156; B24B 7/10; B24B 51/00; B24B 49/12; B25J 11/0065; B25J 9/1633; B25J 9/1664; B25J 9/1697; B25J 13/085; B25J 13/088; B25J 15/0019; B25J 19/00
See application file for complete search history.

(56) References Cited

U.S. PATENT DOCUMENTS

| | | | |
|---|---|---|---|
| 6,264,534 B1* | 7/2001 | Panyard .................. | B24B 49/16 451/24 |
| 2003/0139836 A1* | 7/2003 | Matthews .......... | G01N 21/8806 700/109 |

(Continued)

*Primary Examiner* — Kamini S Shah
*Assistant Examiner* — Zachary Andrew Cain
(74) *Attorney, Agent, or Firm* — Lempia Summerfield Katz LLC

(57) ABSTRACT

An automatic vehicle body sanding system operated in a painting factory includes a painting inspection device configured to detect a defective position (NG Point) by analyzing a 2D image of a vehicle body for which an intermediate process has been completed taken with a camera, and display the defective position on a 3D vehicle body drawing. The automatic vehicle body sanding system includes a robot having a multi-joint structure on which at least one of a 3D scanner, a sanding tool, and a dust absorber required for sanding work is mounted. Further, the automatic vehicle body sanding system includes a server configured to match the defective position of the vehicle body detected by the painting inspection device and 3D scan data of the vehicle body scanned by the 3D scanner with a 3D vehicle body drawing shape on a simulator.

15 Claims, 9 Drawing Sheets

(56) References Cited

U.S. PATENT DOCUMENTS

| | | | | |
|---|---|---|---|---|
| 2017/0066106 A1* | 3/2017 | Bosio | ............... | B24B 41/00 |
| 2018/0326591 A1* | 11/2018 | Häusler | ............... | G01B 11/24 |
| 2020/0171620 A1* | 6/2020 | Aubin | ............... | B24B 49/12 |
| 2021/0276151 A1* | 9/2021 | Hayashi | ............... | B24D 13/18 |
| 2022/0382262 A1* | 12/2022 | Arthur | ............... | G06Q 10/20 |

* cited by examiner (A)

(B)

(C)

SYSTEM AND METHOD FOR AUTOMATIC VEHICLE BODY SANDING

CROSS-REFERENCE TO RELATED APPLICATION

This application claims priority to and the benefit of Korean Patent Application No. 10-2022-0033749, filed in the Korean Intellectual Property Office on Mar. 18, 2022, the entire contents of which are incorporated herein by reference.

BACKGROUND

(a) Technical Field

The present disclosure relates to a system and method for automatic vehicle body sanding. More particularly, the present disclosure relates to a system and method for automatic vehicle body sanding using a three-dimensional (3D) vision simulator.

(b) Description of the Related Art

In general, vehicle body parts are produced by plastically processing a metal material with a mold in factory. In this process, defects that affect appearance quality such as scratches, bends, protrusions, and depressions may occur on the surface. Since the defects are not well covered even after a painting process of a vehicle body, defective areas are identified through inspection and sanding work is performed for improvement.

Conventional vehicle body sanding work is performed manually by workers, but quality deviation may occur depending on the skill of each worker. Further, there is a risk of health deterioration due to dust during sanding, so an automated method for sanding work is being developed.

For example, there is a full sanding method in which a front surface of the vehicle body is polished and then washed using a robot without an inspection process after intermediate painting. However, the full sanding method has drawbacks. It causes secondary dust defects due to excessive dust generation caused by the entire full sanding. Furthermore, the cleaning process must be expanded.

Particularly, there is an issue in that the inspection process is fundamentally omitted so that the defects for each part of the vehicle body cannot be removed.

Therefore, in order to automate the sanding work, it should be possible to horizontally position a sanding tool mounted on a robot at a defective position detected through the inspection and then grind the defective position with appropriate pressure.

In particular, in an actual factory line, various position errors such as surging of a conveyor for transferring the vehicle body, a vehicle body seating error, and stay dispersion may occur, so a solution to these errors is required.

The above information disclosed in this Background section is only to enhance understanding of the background of the disclosure. Therefore, the Background may contain information that does not form the prior art that is already known to a person of ordinary skill in the art.

SUMMARY

The present disclosure provides a system and method for automatic vehicle body sanding having an advantage of matching a defective position of a vehicle body detected from an intermediate painting inspection of a preceding process and 3D scan data of a changed vehicle body in a transfer process with a 3D vehicle body drawing shape on a simulator. Further, the system and method for automatic vehicle body sanding have an advantage of controlling a robot path so that a sanding tool of a robot enters horizontally onto a surface of the defective position.

An embodiment of the present disclosure provides an automatic vehicle body sanding system operated in a painting factory including a painting inspection device configured to detect a defective position (NG Point) by analyzing a two-dimensional (2D) image of a vehicle body for which an intermediate process has been completed taken with a camera. The painting inspection device is also configured to display the defective position on a three-dimensional (3D) vehicle body drawing. The automatic vehicle body sanding system operated in a painting factory further includes a robot having a multi-joint structure on which at least one of a 3D scanner, a sanding tool, and a dust absorber required for sanding work is mounted. The automatic vehicle body sanding system operated in a painting factory further includes a server configured to match the defective position of the vehicle body detected by the painting inspection device and 3D scan data of the vehicle body scanned by the 3D scanner with a 3D vehicle body drawing shape on a simulator. The server is also configured to control the sanding work of the robot by creating a 3D robot path so that a sandpaper of the sanding tool contacts with a surface of the defective position horizontally.

Further, the painting inspection device may be configured to process the 2D image according to a painting inspection algorithm to identify the defective position and a defect type in a predetermined area.

Further, the robot may be configured to scan a plurality of feature points designated on the vehicle body while moving the 3D scanner according to an applied control signal.

Further, the 3D scan data may include a plurality of 3D scan reference coordinates obtained by scanning according to the number of the designated feature points.

Further, the robot may be configured to perform the sanding work for moving the sanding tool to the defective position of the vehicle body according to an applied control signal, and pressing and polishing a surface of the vehicle body by the sandpaper of the sanding tool electrically rotating.

Further, the robot may be operable to control force pressing a surface of the vehicle body during the sanding work. The robot may be configured to measure multi-axial force and torque through a Force Torque (F/T) sensor and transmit them to the server for the force control.

Further, the sanding tool may be configured to mount the sandpaper rotatably on a spindle and adjust sanding revolutions per minute (RPM) of the sandpaper during operation.

Further, the dust absorber may be configured to suck dust generated during the sanding work through a suction tube and deliver the dust to an external dust collector.

Further, the dust absorber may be formed in a dome structure surrounding the sanding tool to suppress dust scattered inside the dome structure from leaking to the outside during the sanding work.

Further, the automatic vehicle body sanding system may further include a sandpaper replacement device including a sandpaper recovery machine and a sandpaper supply machine. The robot may be configured to replace an aged (e.g., used) sandpaper with a new sandpaper by positioning the sanding tool at a home position of the sandpaper recovery machine and the sandpaper supply machine. The positioning to occur at the time of the replacement of the sandpaper.

Further, the sandpaper recovery machine may include: a cylinder on which an aged sandpaper is seated; a limit switch configured to check the seating of the sandpaper; a vision sensor configured to check a home position state of the sanding tool; a gripper configured to grip the seated sandpaper from both sides; and a recovery box. The recovery box is configured to collect the sandpaper released from the grip by the gripper and freely falling after the sandpaper gripped by the gripper is removed from the sanding tool by retraction of the cylinder.

Further, the sandpaper supply machine may include: a cylindrical housing including a suspension rod vertically fixed therein; a suspension plate configured to load the new sandpaper on its upper surface while being penetrated by the suspension rod; a proximity sensor installed at a predetermined supply position and configured to detect a sandpaper positioned on the uppermost layer of the suspension plate; and a linear actuator. The linear actuator is installed to be able to move the suspension plate up and down to raise the suspension plate to a position detected by the proximity sensor when supplying the sandpaper.

Further, the server may include an external interface unit including a wire/wireless communication means for communication with a surrounding equipment, and a scan processing unit. The scan processing unit is configured to create a first matched image obtained by correcting a position error of the vehicle body by matching the 3D scan data with the 3D vehicle body drawing shape on the simulator. The server may further include a robot teaching unit configured to match the 3D vehicle body drawing to the first matched image and process the first matched image into a second matched image on which a defective position of the vehicle body is displayed. The server may further include a database configured to store various programs and data for automatic vehicle body sanding control. Furthermore, the server may include a controller configured to control the sanding work of the robot in a normal direction in consideration of a surface angle of the defective position through the 3D robot path.

Further, the scan processing unit may be configured to transform 3D scan reference coordinates corresponding to a feature point of the 3D scan data into reference coordinates based on the sanding system applied to the 3D vehicle body drawing shape.

Further, the robot teaching unit may be configured to transform 3D coordinates corresponding to the defective position into reference coordinates of the sanding system to identify the defective position on the second matched image.

Further, the controller may be configured to adjust pressure applied by the sanding tool and sanding RPM of the sanding tool using the robot according to a defect type or defect level of the defective position during the sanding work, and replace the sandpaper with a sandpaper of a predetermined roughness.

Another embodiment of the present disclosure provides a method of automatically sanding a vehicle body by an automatic vehicle body sanding system. The vehicle body is transferred through a painting inspection of an intermediate process, the method including: a) acquiring 3D scan data by scanning a plurality of feature points designated on the vehicle body through a 3D scanner mounted on a robot, b) creating a first matched image in which a position error of the vehicle body is corrected by matching a 3D vehicle body drawing shape on a simulator to the 3D scan data, c) matching a 3D vehicle body drawing received as a result of painting inspection of a preceding process to the first matched image to process the first matched image into a second matched image on which a defective position of the vehicle is displayed, and d) controlling sanding work by creating a 3D robot path so that a lower surface of a sandpaper of the sanding tool mounted on the robot enters horizontally and proceeds in a normal direction with respect to a surface of the defective position.

Further, the operation b) may include transforming 3D scan reference coordinates of the 3D scan data into reference coordinates based on the sanding system applied to the 3D vehicle body drawing shape when creating the first matched image. The operation c) may include transforming 3D coordinates corresponding to the defective position into reference coordinates of the sanding system when processing the second matched image to identify the defective position on the second matched image.

Further, the operation d) may include performing control to adjust at least one of roughness of the sandpaper for each defect type, sanding RPM, and pressure applied by the sanding tool through force control during the sanding work.

Further, after the operation d), the method may further include counting operation time of the sanding tool during the sanding work to determine whether accumulated time of actually performing the sanding work from a time of replacement with a current sandpaper exceeds a threshold value. If the accumulated time exceeds the threshold value, determining the replacement time and sequentially positioning the sanding tool at predetermined positions of a sandpaper recovery machine and a sandpaper supply machine through the robot to remove an aged sandpaper and automatically replace it with a new sandpaper.

According to an embodiment of the present disclosure, automatic sanding work on a defective position is possible by matching a defective position of a vehicle body and 3D scan data of the changed vehicle body with a 3D vehicle body drawing shape on a simulator to create a robot path. An intermediate process has been completed for the defective position of a vehicle body.

In addition, it is possible to perform precise sanding work by controlling a sanding tool of a robot to horizontally enter a defective position surface of the vehicle body through the robot path, adjusting applied pressure and sanding RPM using the robot, and controlling a roughness level of a sandpaper according to a defect type.

In addition, it is possible to maintain convenience of management and reliable sanding performance by predicting the replacement time according to the amount of sandpaper used for the actual sanding work, and allowing the robot to automatically replace an aged sandpaper with a new sandpaper through a sandpaper replacement device.

BRIEF DESCRIPTION OF THE DRAWINGS

In order that the disclosure may be well understood, there will now be described various forms thereof, given by way of example, reference being made to the accompanying drawings, in which.

Figure 1:
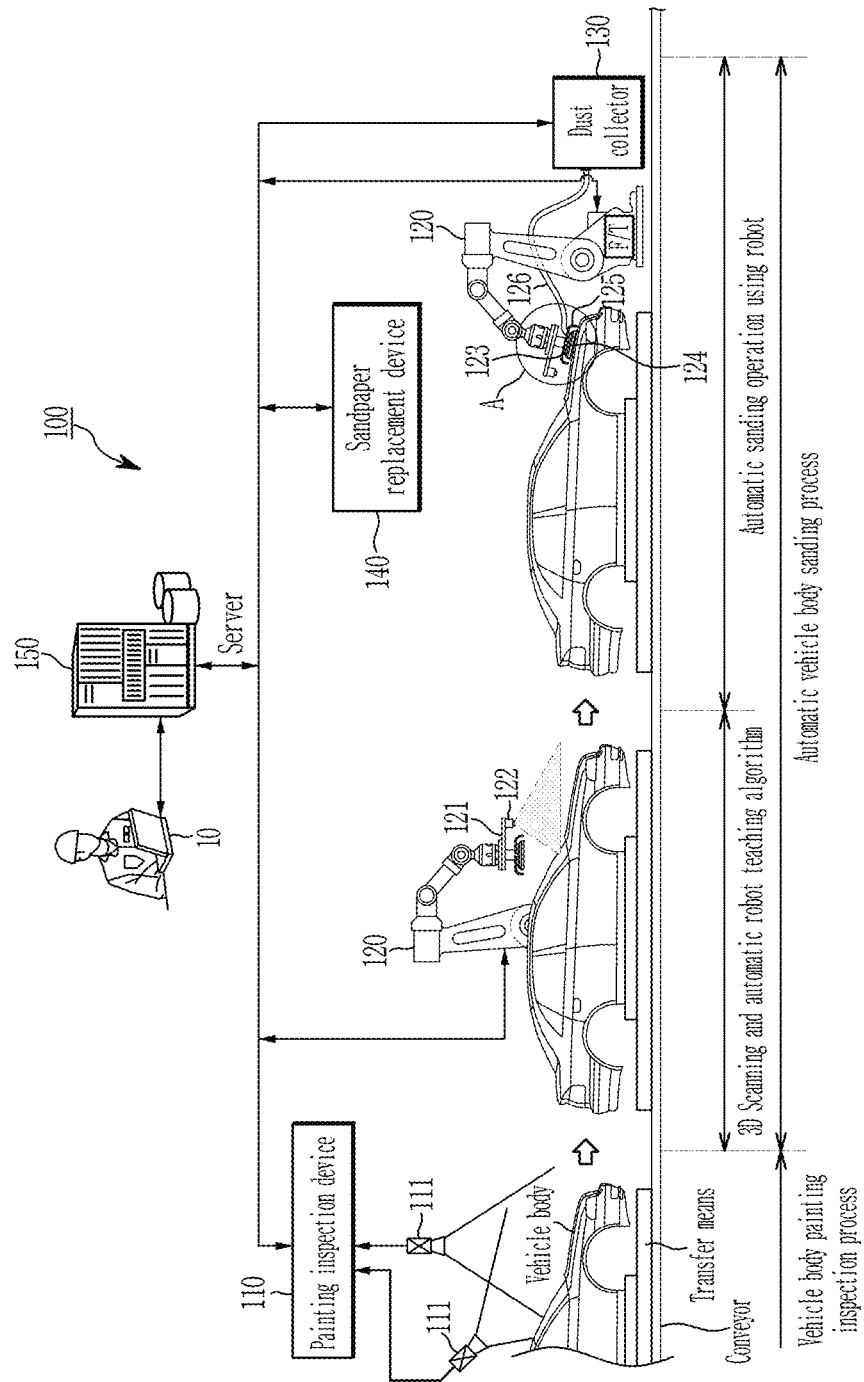
FIG. 1 schematically illustrates an automatic vehicle body sanding system according to an embodiment of the present disclosure.

The drawings described herein are for illustration purposes only and are not intended to limit the scope of the present disclosure in any way.

DETAILED DESCRIPTION

Hereinafter, an embodiment of the present disclosure is described in detail with reference to the accompanying drawings so that a person of ordinary skill in the art can easily make it.

The terminology used herein is for the purpose of describing particular embodiments only and is not limited to the present disclosure. As used herein, the singular forms are intended to include the plural forms as well, unless the context clearly indicates otherwise.

It should be further understood that the terms "includes," "including," "comprises," and/or "comprising," when used in this specification, specify the presence of stated features, integers, steps, operations, constituent elements, and/or components, but do not preclude the presence or addition of one or more other features, integers, steps, operations, constituent elements, components, and/or groups thereof.

As used herein, the term "and/or" includes any one or all combination of any two or more of the associated listed items.

Throughout the specification, it should be understood that although terms such as first, second, (a), (b), and the like may be used herein to describe various constituent elements, these constituent elements should not be limited by these terms.

Each of these terminologies is not used to define an essence, order, or sequence of a corresponding constituent element but used merely to distinguish the corresponding constituent element from other constituent element(s).

Throughout the specification, when it is mentioned that one constituent element is "connected" or "coupled" to another constituent element, it should be understood that the one constituent element may be directly connected or coupled to the other constituent element or that still another component is interposed between the two constituent elements.

In contrast, it should be noted that if it is described in the specification that one constituent element is "directly connected" or "directly coupled" to another constituent element, no other constituent element is present therebetween.

When a component, device, element, or the like of the present disclosure is described as having a purpose or performing an operation, function, or the like, the component, device, or element should be considered herein as being "configured to" meet that purpose or to perform that operation or function.

Additionally, it is understood that one or more of the following methods or aspects thereof may be executed by at least one controller. The term "controller" may refer to a hardware device including a memory and a processor.

The memory is configured to store program instructions, and the processor is specifically programmed to execute the program instructions to perform one or more of processes described in detail below. The controller may control operation of units, modules, parts, devices, or the like, as described herein. Those having ordinary skill in the art should understand that such blocks, units and/or modules are physically implemented by electronic (or optical) circuits such as logic circuits, discrete components, processors, hard wired circuits, memory devices and wiring connections. When the blocks, units and or modules are implemented by processors or other similar hardware, the blocks, units and modules may be programmed and controlled through software (for example, codes) in order to perform various functions discussed in the present disclosure.

It is also understood that the following methods may be executed by a device including a controller in conjunction with at least one other component, as should be appreciated by a person of ordinary skill in the art.

Further, the controller of the present disclosure may be implemented as a non-transitory computer-readable recording medium including executable program instructions executed by a processor. Examples of computer-readable recording media include read-only memory (ROM), random-access memory (RAM), compact disk (CD) ROM, magnetic tapes, floppy disks, flash drives, smart cards, and optical data storage devices, but are not limited thereto.

The computer-readable recording media may also be distributed over a computer network so that program instructions may be stored and executed in a distributed fashion, for example, a telematics server or a Controller Area Network (CAN).

Now, a system and method for automatic vehicle body sanding according to an embodiment of the present disclosure is described in detail with reference to the drawings.

FIG. 1 schematically illustrates an automatic vehicle body sanding system according to an embodiment of the present disclosure.

Figure 2:
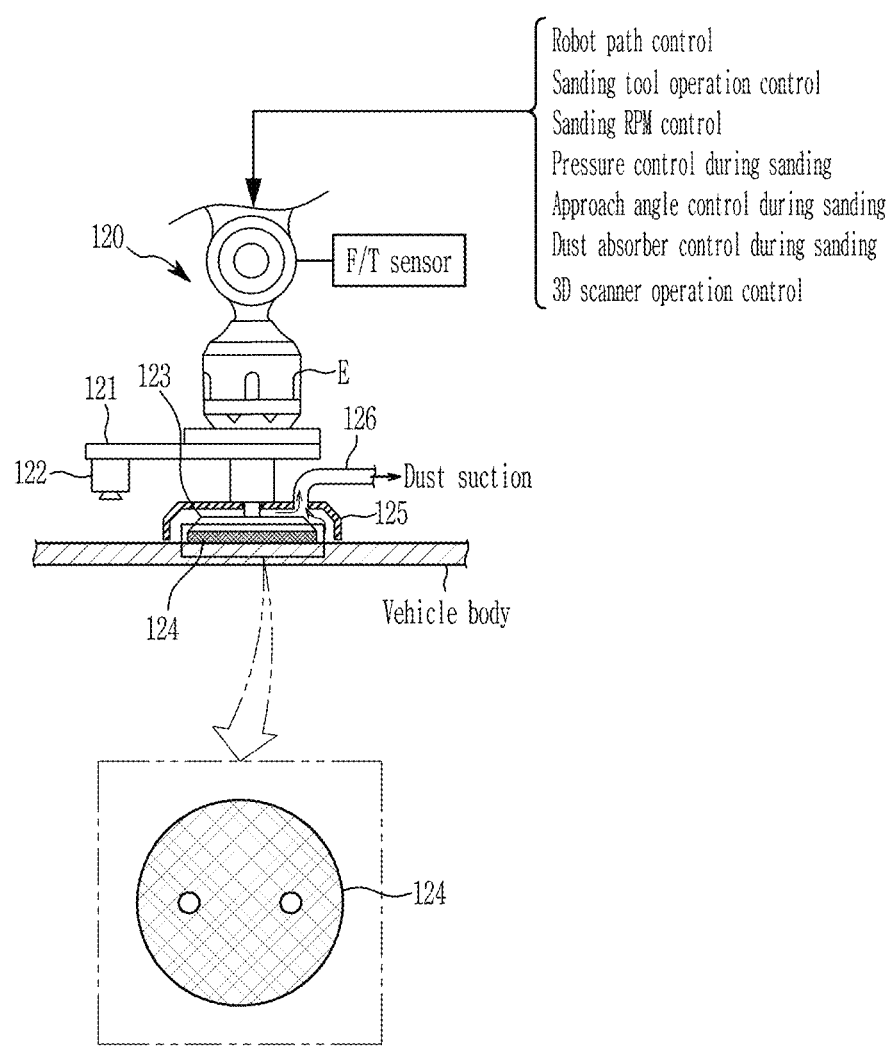
FIG. 2 is an enlarged view of part "A" of FIG. 1 illustrating a tool mount structure of a robot for sanding work.

FIG. 2 is an enlarged view of part "A" of FIG. 1 illustrating a tool mount structure of a robot for sanding work.

Referring to FIG. 1 and FIG. 2, an automatic vehicle body sanding system 100, according to an embodiment of the present disclosure, is line equipment for a vehicle body intermediate inspection process and an automatic vehicle body sanding process of a painting factory.

The automatic vehicle body sanding system 100 may include a painting inspection device (e.g., painting inspection apparatus) 110, a collaborative robot 120 for automatic sanding work, a dust collector 130, a sandpaper replacement device 140, and a server 150.

First, a vehicle body for which an intermediate process has been completed in a vehicle painting factory is seated on a moving means (e.g., transfer means, conveyor, and the like). The vehicle body is transferred to the automatic vehicle body sanding process after going through a vehicle body painting inspection process along a conveyor.

The painting inspection apparatus 110 may detect a defective position (NG Point) by analyzing a 2D image captured by a camera 111 of the vehicle body for which the intermediate process has been completed, and display the NG Point on a 3D vehicle body drawing (3D computer-aided design (CAD)).

Figure 7:
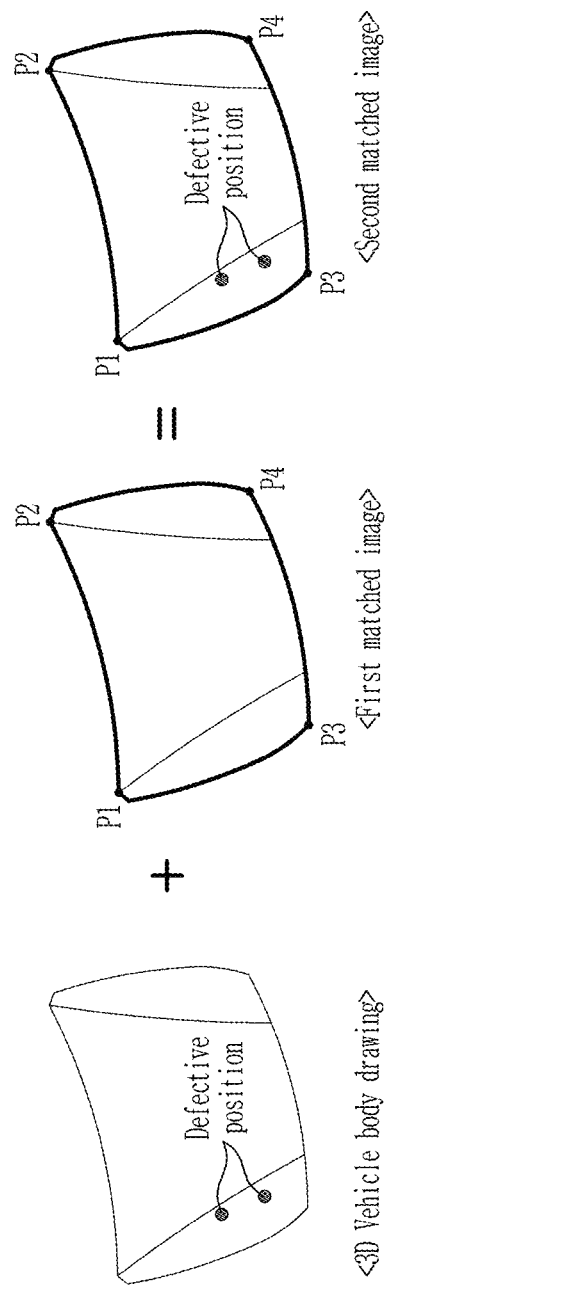
FIG. 7 illustrates a robot teaching method for automatic sanding work according to an embodiment of the present disclosure.

The defective position (NG Point) is displayed as a predetermined area on the 3D vehicle body drawing and transmitted to the server 150 (see FIG. 7).

The camera 111 may be disposed on an upper portion, and left and right sides of the vehicle body to capture a 2D image of a vehicle body part unit. For example, the vehicle body part unit may be a bonnet, a door, or a hood of the vehicle body.

The painting inspection apparatus 110 may process the 2D image according to a painting inspection algorithm to identify the defective position (NG Point) and a defect type of the predetermined area.

For example, the defect type may be a scratch, curve, protrusions, depressions, and the like. A degree of non-uniformity of a painting state may be identified as a numerical level.

The robot 120 is a Collaborative Robot with a multi-joint structure, and at least one of a 3D scanner 122, a sanding tool 123, and a dust absorber 125. The dust absorber 125, which is required for the sanding work, is mounted on the robot 120 through a mount bracket 121 engaged to an End-Effector (E).

The robot 120 may be disposed on both sides with respect to the conveyor to perform cooperative work by dividing a sanding work area for each vehicle body part for one vehicle body.

The robot 120 may scan a plurality of feature points designated on the vehicle body while moving the 3D scanner 122 according to a control signal applied thereto.

Scanning using the 3D scanner 122 works for accurately identifying a current vehicle body position. Without the 3D scanner 122, position error may occur because the position of the vehicle body is inevitably changed little by little in the process of seating the vehicle body on transfer means of the conveyor.

Figure 3:
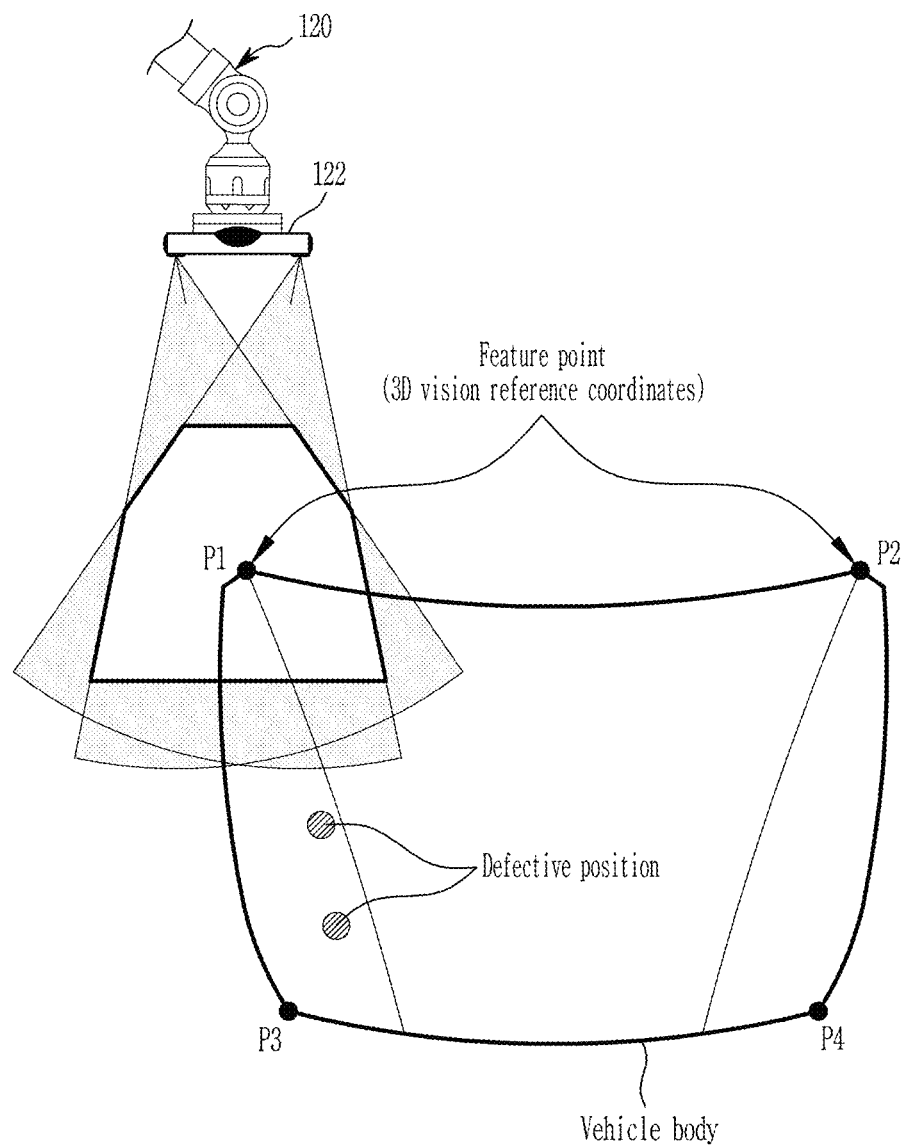
FIG. 3 illustrates a scan method of feature points of a vehicle body using a 3D scanner according to an embodiment of the present disclosure.

For example, FIG. 3 illustrates a scan method of feature points of a vehicle body using a 3D scanner according to an embodiment of the present disclosure.

Referring to FIG. 3, the 3D scanner 122 uses a 3D structured light laser sensor to scan feature points (e.g., P1, P2, P3, and P4) designated on the vehicle body and its transfer means to create 3D scan data.

The 3D scan data includes a plurality of (N) 3D scan reference coordinates obtained by scanning N times according to the number of the designated feature points.

Hereinafter, the four feature points P1, P2, P3, and P4 are exemplified for better understanding of the description. Still, an embodiment of the present disclosure is not limited thereto, and at least two or more may be designated.

The 3D scanner 122 is calibrated to have the same viewpoint as the sanding tool 123 mounted on the end-effector E of the robot 120, and is sequentially moved to sites of the feature points P1, P2, P3, and P4 by controlling a pose of the robot 120.

Further, the robot 120 moves the sanding tool 123 to the defective position of the vehicle body according to the applied control signal. The robot 120 performs the sanding work in which a surface of the vehicle body is pressed and polished by a sandpaper 124 of the electrically rotating sanding tool 123.

The robot 120 is able to control force pressing the surface of the vehicle body during the sanding work. The robot 120 measures multi-axial force and torque through a Force Torque (F/T) sensor and transmits it to the server 150 for the force control.

The sanding tool 123 may rotationally mount the sandpaper 124 on a spindle of a servomotor and adjust sanding revolutions per minute (RPM) of the sandpaper 124 during operation.

The sandpaper 124 includes circular sandpaper or mesh cloth for grinding the surface of the vehicle body in a rotational manner.

The sandpaper 124 is disposable, i.e., replaced, and is provided for each roughness level (e.g., 100 grit, 200 grit, 300 grit, and the like.) for each operation so that it may be used in response to the defect type or defect level of the surface of the vehicle body.

The dust absorber 125 sucks dust generated during the sanding work through a suction tube 126 and delivers it to the dust collector 130. The dust absorber 125 may be formed in a dome structure surrounding the sanding tool 123 to suppress dust scattered inside the dome structure from leaking to the outside during the sanding work as much as possible.

The dust collector 130 generates a suction force of the dust absorber 125 through the suction tube 126, and stores the dust transferred through the suction tube 126.

Figure 4:
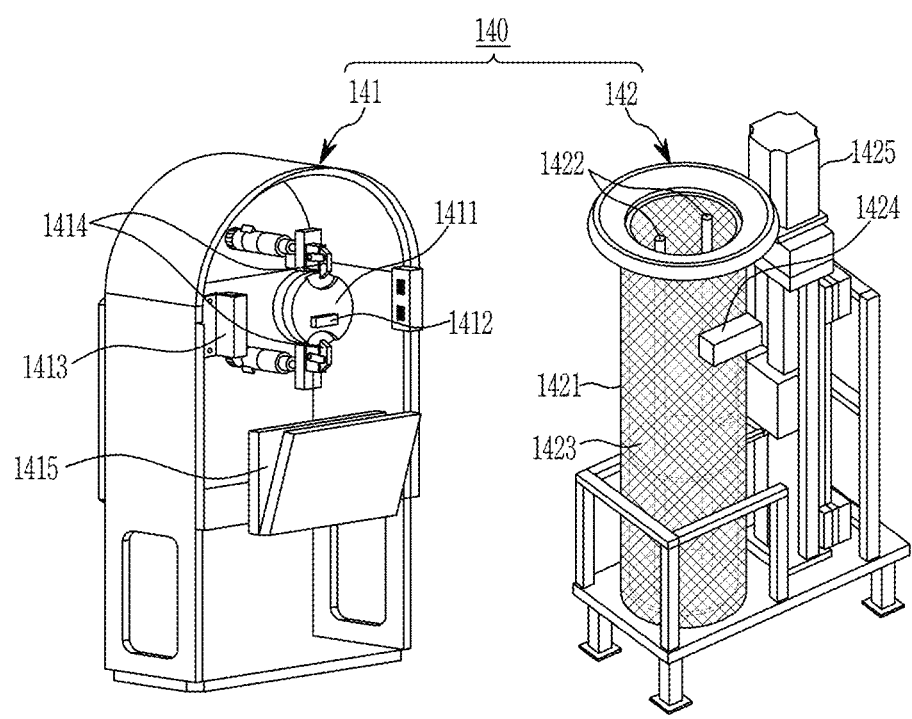
FIG. 4 illustrates a configuration of a sandpaper replacement device according to an embodiment of the present disclosure.

FIG. 4 illustrates a configuration of a sandpaper replacement device according to an embodiment of the present disclosure.

Referring to FIG. 4, the sandpaper replacement device 140, according to an embodiment of the present disclosure, includes a sandpaper recovery machine 141 for removing an aged sandpaper 124 from the sanding tool 123 and a sandpaper supply machine 142 for supplying a new sandpaper 124 to the sanding tool 123.

The robot 120 may replace the aged sandpaper 124 with a new sandpaper 124 by positioning the sanding tool 123 at a predetermined position of the sandpaper recovery machine 141 and the sandpaper supply machine 142. The positioning to occur at the time of the replacement of the sandpaper 124.

The sandpaper recovery machine 141 may include: a cylinder 1411; a limit switch 1412; a vision sensor 1413; a gripper 1414; and a recovery box 1415.

First, the aged sandpaper 124 may be seated on the cylinder 1411. The limit switch 1412 may check the seating of the sandpaper 124.

The vision sensor 1413 may check a home position state of the sanding tool 123. The gripper 1414 may grip the seated sandpaper 124 from both sides.

The sandpaper 124 gripped by the gripper 1414 may be removed from the sanding tool 123 by retraction of the cylinder 1411. Then the recovery box 1415 may collect the sandpaper 124 that is released from the grip by the gripper 1414 and fall freely.

The sandpaper supply machine 142 includes: a cylindrical housing 1421 including one or more suspension rods 1422 vertically fixed therein, a suspension plate 1423 having an upper surface on which the new sandpaper 124 is loaded while being penetrated by the one or more suspension rods 1422; a proximity sensor 1424 installed at a predetermined supply position to detect the new sandpaper 124 positioned on the uppermost layer of the suspension plate 1423; and a linear actuator 1425. The linear actuator 1425 is installed to be able to move the suspension plate 1423 up and down and to raise the suspension plate 1423 to a position detected by the proximity sensor 1424 when supplying the new sandpaper 124.

Figure 5:
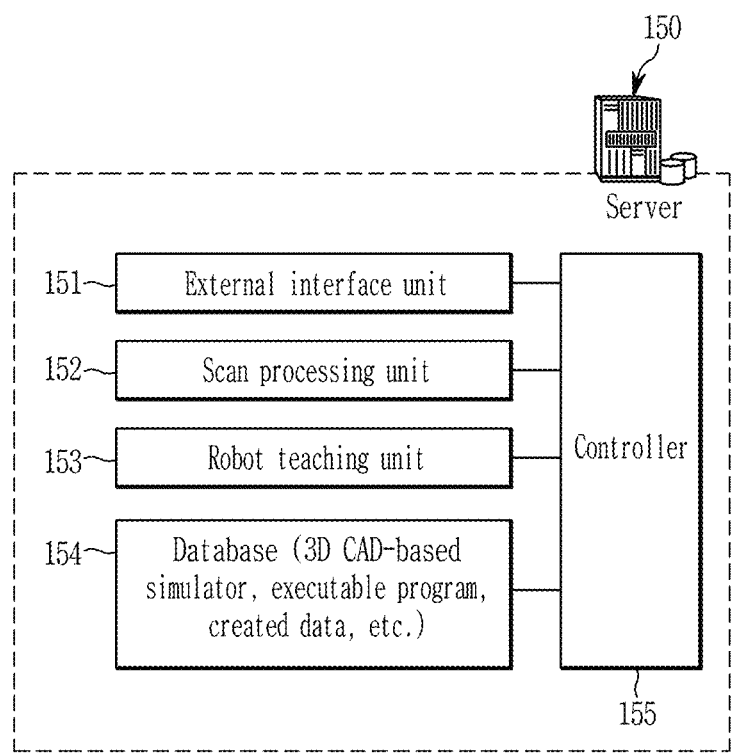
FIG. 5 illustrates a server of an automatic vehicle body sanding system according to an embodiment of the present disclosure.

FIG. 5 shows a server of an automatic vehicle body sanding system according to an embodiment of the present disclosure.

Referring to FIG. 5, the server 150, according to an embodiment of the present disclosure, is constructed using a computer device that controls the overall operation of various equipment applied to the automatic vehicle body sanding system 100, including wire/wireless communication means.

The server 150 includes an external interface unit 151, a scan processing unit 152, a robot teaching unit 153, a Data Base (DB) 154, and a controller 155.

The external interface unit 151 includes at least one wire/wireless communication means for communication with surrounding equipment, such as the painting inspection device 110, the robot 120, the dust collector 130, the sandpaper replacement device 140, and an operator terminal 10. The operator terminal 10 includes an information communication terminal such as a computer, a laptop, and a tablet.

Hereinafter, a method of matching a vehicle body image using a 3D vision simulator and an automatic robot teaching method, according to an embodiment of the present disclosure, is described with reference to FIG. 6 and FIG. 7.

Figure 6:
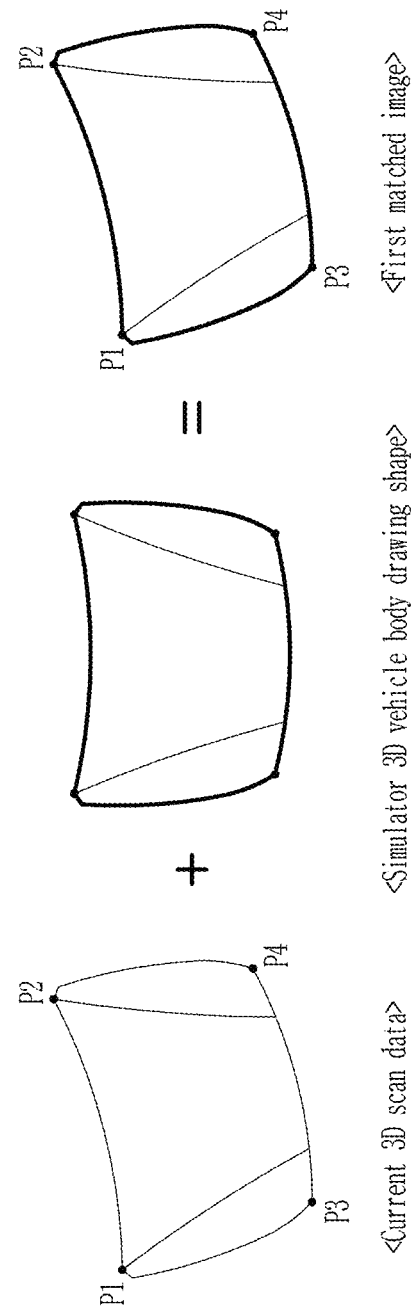
FIG. 6 illustrates an image matching method for correcting a position error of a vehicle body according to an embodiment of the present disclosure.

FIG. 6 illustrates an image matching method for correcting a position error of a vehicle body according to an embodiment of the present disclosure.

Referring to FIG. 6, the scan processing unit 152, according to an embodiment of the present disclosure, creates a matched image (hereinafter, referred to as a "first matched image"). The matched image is obtained by correcting the position error of the vehicle body by matching 3D scan data obtained by scanning the plurality of feature points P1, P2, P3, and P4 designated on the vehicle body through the 3D scanner 122 with a 3D vehicle body drawing shape on the simulator.

The scan processing unit 152 transforms the 3D scan reference coordinates corresponding to the feature points P1, P2, P3, and P4 of the 3D scan data into reference coordinates based on a sanding system applied to the 3D vehicle body drawing shape when creating the matched image.

By this, it is possible to reflect and correct the position error of the vehicle body currently seated on the transfer means on the simulator of the sanding system.

To explain this in further detail, the 3D vehicle body drawing shape is master sample CAD data applied on the simulator and includes reference coordinates based on a coordinate system set in the sanding system.

In addition, the coordinate system set in the sanding system means three-dimensional space coordinates constructed to move the sanding tool 123 of the robot 120 according to the 3D vehicle body drawing shape.

Therefore, the scan processing unit 152 may precisely match and merge feature points of the 3D vehicle body drawing shape based on the feature points P1, P2, P3, and P4 of the 3D scan data corresponding to the changed position of the vehicle body. The scan processing unit 152 may also transform the 3D scan reference coordinates applied to the 3D scan data into the reference coordinates of the sanding system for automatic sanding work using the robot 120.

Here, the scan processing unit 152 may calculate a coefficient required to transform the 3D scan reference coordinates into the reference coordinates of the sanding system using a 3D coordinates matrix.

In addition, if a robot path is created using the 3D vehicle body drawing shape of the first matched image created by the scan processing unit 152, it would be possible to perform full sanding work on the entire surface of the vehicle body.

However, as described above, the full sanding method has drawbacks because it causes secondary dust defects due to excessive dust generation, and thus a cleaning process must be expanded.

Accordingly, the server 150, according to an embodiment of the present disclosure, may match the defective position (NG Point) detected by the painting inspection device 110 to the 3D vehicle body drawing shape of the first matched image, and control partial sanding work by moving the sanding tool 123 of the robot 120 only for the defective position.

FIG. 7 illustrates a robot teaching method for automatic sanding work according to an embodiment of the present disclosure.

Referring to FIG. 7, the robot teaching unit 153, according to an embodiment of the present disclosure, matches the 3D vehicle body drawing received from the painting inspection device 110 to the first matched image and processes it into a second matched image in which the defective position (NG Point) of the vehicle body is displayed.

Then, the robot teaching unit 153 transforms 3D coordinates corresponding to the defective position (NG Point) into the reference coordinates of the sanding system to identify a defective position (NG Point) on the second matched image.

Here, the 3D vehicle body drawing in which the defective position (NG Point) is displayed and the 3D vehicle body drawing shape of the simulator may be the same drawing created by the 3D CAD.

Therefore, the robot teaching unit 153 may calculate a value and a coefficient (Matched Transform) obtained by transforming the 3D vehicle body drawing shape in accordance with the 3D scan data (the current vehicle body position) in the matching process for creating the first matched image. The robot teaching unit 153 may then transform coordinates of the defective position (NG Point) into the reference coordinates of the sanding system by using the value and the coefficient.

This may be understood as augmenting and displaying the defective position (NG Point) on the second matched image in which the same 3D vehicle body surface shape is merged in accordance with the current vehicle body position.

The robot teaching unit 153 creates a 3D robot path so that a lower surface of the sandpaper 124 of the sanding tool 123 enters horizontally and proceeds in a normal direction with respect to the surface of the defective position (NG Point) displayed on the matched image, and transmits it to the controller 155.

The robot teaching unit 153 may create each 3D robot path to perform cooperative work by dividing a sanding work area for each part of the vehicle body according to positions of a plurality of the robots 120 disposed on the automatic vehicle body sanding system 100.

For example, the 3D robot path may be created so that the robots 120 are disposed on the left and right sides of the conveyor, respectively, and left and right doors of the vehicle body, or divide a bonnet area into left and right for cooperative sanding.

The robot teaching unit 153 may create the 3D robot path defined on the body surface of the 3D drawing shape in advance, and master sample CAD data in which the characteristic points of each component of the vehicle body surface corresponding thereto are defined, and store them in the DB 154. The robot teaching unit 153 may then apply the 3D robot path and master sample CAD data to the simulator of the sanding system.

Further, the robot teaching unit 153 may create master sample CAD data in which a high-precision 3D robot path is defined by aligning a pre-made body sample in a home position when a new vehicle is applied to the sanding system and then inputting a path line to various parts of a 3D point cloud type body drawing shape obtained by scanning the 3D scanner 122.

Further, the DB 154 stores various programs and data for automatic vehicle body sanding control of the server 150 according to an embodiment of the present disclosure. Furthermore, the DB 154 stores data created according to the operation of the server 150.

For example, the DB 154 may store a program for executing functions of a 3D CAD-based simulator, the scan processing unit 152, and the robot teaching unit 153. The DB 154 may store data created according to the execution.

The controller 155 is a central processing unit that controls the overall operation of each unit included in the server 150 according to an embodiment of the present disclosure. The controller 155 may execute various programs stored in the DB 154 and implement functions of each unit.

For example, the controller 155 may execute programs of the scan processing unit 152 and the robot teaching unit 153 to match the defective position of the vehicle body detected through the intermediate painting inspection of the preceding process and the 3D scan data of the vehicle body scanned with the 3D scanner with the 3D vehicle body drawing shape on the simulator.

Further, the controller 155 may control the sanding work of the robot 120 by creating the 3D robot path so that the sandpaper 124 of the sanding tool 123 contacts with the surface of the defective position horizontally.

Figure 8:
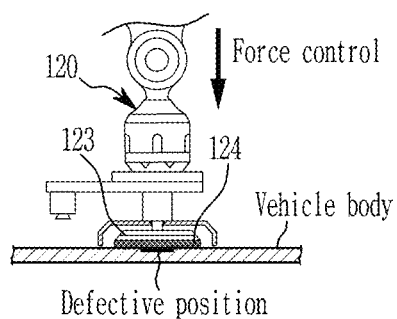
FIG. 8 illustrates a sanding work control state through a 3D robot path according to an embodiment of the present disclosure.
Figure 8:
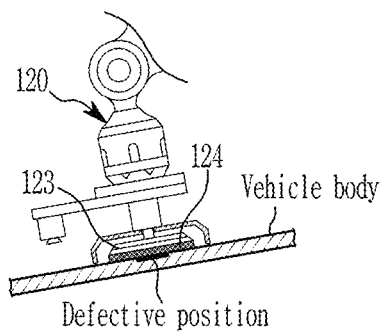
Figure 8:
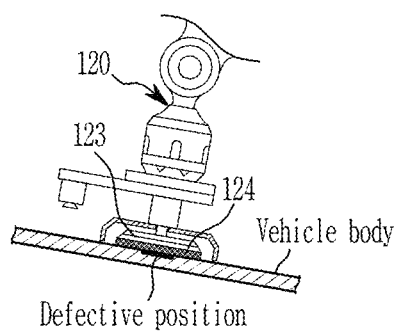

For example, FIG. 8 illustrates a sanding work control state through a 3D robot path according to an embodiment of the present disclosure.

Referring to FIG. 8, the controller 155 may let the sanding tool 123 enter horizontally to correspond to a change in a surface angle of the vehicle body by matching the current position of the vehicle body and the painting defective position with the 3D vehicle body drawing shape on the simulator and creating the 3D robot path.

Further, the controller 155 may control the sanding work in a normal direction in consideration of the surface angle of the defective position through the 3D robot path.

The controller 155 may adjust the sanding RPM of the sanding tool 123 according to the defect type/defect level of the defective position during the sanding work.

Further, the controller 155 may control the force of the robot 120 according to the defect type/defect level during the sanding work to adjust the pressure applied to the vehicle body through the sanding tool 123.

The controller 155 may receive multi-axial force and torque feedback through the F/T sensor of the robot 120 and perform force control to apply a pressure corresponding to the defect type.

Further, the controller 155 may replace the sandpaper 124 with a sandpaper of a predetermined roughness according to the defect type/defect level of the defective position during the sanding work.

Further, the controller 155 counts the operation time of the sanding tool 123 from the time when the new sandpaper 124 is mounted, and when the accumulated time for actual sanding work exceeds a threshold value, the controller 155 determines replacement time.

The controller 155 may sequentially position the sanding tool 123 of the robot 120 at predetermined positions of the sandpaper recovery machine 141 and the sandpaper supply machine 142 at the replacement time to remove an aged sandpaper 124 and replace it with a new sandpaper 124.

The controller 155 may be implemented as at least one processor operated by a predetermined program. The predetermined program may be programmed to perform each operation of an automatic vehicle body sanding method using the robot 120 according to an embodiment of the present disclosure.

This automatic vehicle body sanding method is described in more detail with reference to the drawings below.

Figure 9:
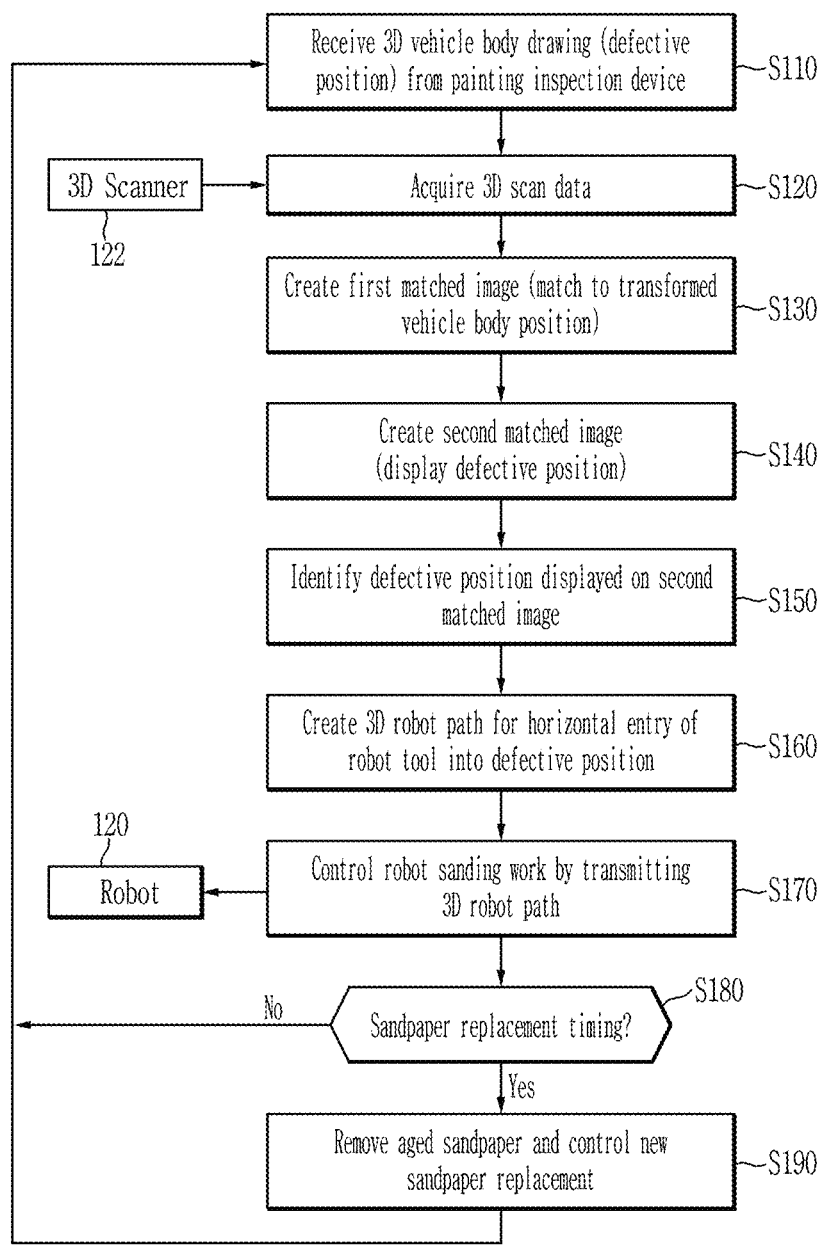
FIG. 9 is a flowchart schematically illustrating an automatic vehicle body sanding method according to an embodiment of the present disclosure.

FIG. 9 is a flowchart schematically illustrating an automatic vehicle body sanding method according to an embodiment of the present disclosure.

Referring to FIG. 9, the automatic vehicle body sanding method, according to an embodiment of the present disclosure, is described if the vehicle body for which the intermediate process has been completed is seated on the transfer means and transferred to the automatic vehicle body sanding process through the vehicle body painting inspection process along the conveyor.

The controller 155 of the automatic vehicle body sanding system 100 receives a 3D vehicle body drawing (3D CAD) in which a defective position (NG point) of the vehicle body is displayed from the painting inspection device 110 of the preceding process (S110).

The controller 155 acquires 3D scan data by scanning a plurality of feature points designated on the vehicle body seated on the transfer means of the conveyor through the 3D scanner 122 mounted on the robot 120 (S120).

A plurality of feature points such as vertices of the vehicle body to match with the 3D vehicle body drawing shape (3D CAD) on the simulator may be designated as scan positions.

The controller 155 may acquire 3D scan data including a plurality of (N) 3D scan reference coordinates obtained by scanning N times according to the number of the designated plurality of feature points.

The controller 155 creates a first matched image in which a position error of the vehicle body is corrected by matching the 3D vehicle body drawing shape on the simulator to the 3D scan data (S130).

The controller 155 transforms the 3D scan reference coordinates of the 3D scan data into the reference coordinates based on the sanding system applied to the 3D vehicle body drawing shape.

The controller 155 processes the first matched image by matching the 3D vehicle body drawing (3D CAD) received as a result of the painting inspection of the preceding process to the first matched image into a second matched image (S140).

Further, the controller 155 identifies the defective position displayed on the 3D vehicle body drawing shape of the second matched image (S150).

The controller 155 transforms the defective position (NG Point) displayed on the 3D vehicle body drawing (3D CAD) into the reference coordinates based on the sanding system applied to the 3D vehicle body drawing shape.

The controller 155 creates the 3D robot path so that a lower surface of the sandpaper 124 of the sanding tool 123 mounted on the robot 120 enters horizontally and proceeds in a normal direction with respect to the surface of the defective position (NG Point) (S160).

The controller 155 may create corresponding number of 3D robot paths according to the number of the defective positions (NG points) partially displayed on the surface of the vehicle body.

The controller 155 transmits the 3D robot path to the robot 120 and controls the robot 120 to perform the sanding work on the defective position of the vehicle body (S170).

The controller 155 may control at least one of the roughness of the sandpaper 124 for each defect type, sanding RPM, and pressure applied by the sanding tool 123 through force control set according to sanding work algorithm (e.g., program and probabilistic model) learned in advance to be adjusted.

The controller 155 counts the operation time of the sanding tool 123 during the sanding work and determines whether the accumulated time of performing the actual sanding work from the time of replacement with the current sandpaper 124 exceeds a threshold value (S180).

If the accumulated time exceeds the threshold value, the controller 155 determines that it is the replacement time (S180; Yes), and controls the robot 120 to sequentially position the sanding tool 123 at predetermined positions of the sandpaper recovery machine 141 and the sandpaper supply machine 142 to remove the aged sandpaper 124 and automatically replace it with a new sandpaper 124 (S190).

In contrast, if the accumulated time does not exceed the threshold value, the controller 155 determines that it is not the replacement time (S180; No), and continues to use the current sandpaper 124.

The automatic replacement of the sandpaper 124 may be performed after the sanding work is completed for one vehicle body or during a waiting time immediately before the vehicle body is transferred.

As described above, according to an embodiment of the present disclosure, automatic sanding work on a defective position is possible by matching a defective position of a vehicle body for which an intermediate process has been completed and 3D scan data of the changed vehicle body with a 3D vehicle body drawing shape on a simulator to create a robot path.

In addition, it is possible to perform precise sanding work by controlling a sanding tool of a robot to horizontally enter a defective position surface of the vehicle body through the robot path, adjusting applied pressure and sanding RPM using the robot, and controlling a roughness level of a sandpaper according to a defect type.

In addition, it is possible to maintain convenience of management and reliable sanding performance by predicting the replacement time according to the amount of sandpaper used for the actual sanding work and allowing the robot to automatically replace an aged sandpaper with a new sandpaper through a sandpaper replacement device.

An embodiment of the present disclosure is not implemented only through the device and/or method described above. The embodiment may be implemented through a program for realizing a function corresponding to the configuration of an embodiment of the present disclosure, a recording medium in which the program is recorded, and the like. This implementation may be easily made by those having ordinary skill in the art.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

100: Automatic vehicle body sanding system
110: Painting inspection device
111: Camera
120: Robot
121: Mount bracket
122: 3D scanner
123: Sanding tool
124: Sandpaper
125: Dust absorber
126: Suction tube
130: Dust collector
140: Sandpaper replacement device
141: Sandpaper recovery machine
142: Sandpaper supply machine
150: Server
151: External interface unit
152: Scan processing unit
153: Robot teaching unit
154: Database (DB)

What is claimed is:

1. An automatic vehicle body sanding system operated in a painting factory, the automatic vehicle body sanding system comprising:
   a painting inspection device including a camera disposed on a vehicle body and configured to capture a two-dimensional (2D) image of the vehicle body for which an intermediate process has been completed taken and to process the 2D image based on a painting inspection algorithm to identify a defective position (NG Point), and display the NG Point on a three-dimensional (3D) vehicle body drawing;
   a robot having a multi-joint structure on which at least one of a 3D scanner, a sanding tool, or a dust absorber for sanding work is mounted;
   a server configured to match the defective position of the vehicle body detected by the painting inspection device and 3D scan data of the vehicle body scanned by the 3D scanner with a 3D vehicle body drawing shape on a simulator, and control the sanding work of the robot by creating a 3D robot path so that a sandpaper of the sanding tool contacts with a surface of the defective position horizontally; and
   a sandpaper replacement device including a sandpaper recovery machine and a sandpaper supply machine,
   wherein the sandpaper recovery machine includes:
      a cylinder on which the aged sandpaper is seated;
      a limit switch configured to check the seating of the sandpaper;
      a vision sensor configured to check a home position state of the sanding tool;
      a gripper configured to grip the seated sandpaper from both sides; and
      a recovery box configured to collect the sandpaper released from the grip by the gripper and freely falling after the sandpaper gripped by the gripper is removed from the sanding tool by retraction of the cylinder.

2. The automatic vehicle body sanding system of claim 1, wherein:
   the painting inspection device is configured to process the 2D image according to a painting inspection algorithm to identify the defective position and a defect type in a predetermined area.

3. The automatic vehicle body sanding system of claim 1, wherein:
the robot is configured to scan a plurality of feature points designated on the vehicle body while moving the 3D scanner according to an applied control signal.

4. The automatic vehicle body sanding system of claim 1, wherein:
the 3D scan data includes a plurality of 3D scan reference coordinates obtained by scanning according to a number of designated feature points.

5. The automatic vehicle body sanding system of claim 1, wherein:
the robot is configured to perform the sanding work for moving the sanding tool to the defective position of the vehicle body according to an applied control signal and pressing and polishing a surface of the vehicle body by the sandpaper of the sanding tool electrically rotating.

6. The automatic vehicle body sanding system of claim 1, wherein:
the robot is operable to control force pressing a surface of the vehicle body during the sanding work, and configured to measure multi-axial force and torque through a Force Torque (F/T) sensor and transmit them to the server for the force control.

7. The automatic vehicle body sanding system of claim 1, wherein:
the sanding tool is configured to mount the sandpaper rotatably on a spindle and adjust sanding revolutions per minute (RPM) of the sandpaper during operation.

8. The automatic vehicle body sanding system of claim 1, wherein:
the dust absorber is configured to suck dust generated during the sanding work through a suction tube and deliver the dust to an external dust collector.

9. The automatic vehicle body sanding system of claim 1, wherein:
the dust absorber is formed in a dome structure surrounding the sanding tool to suppress dust scattered inside the dome structure from leaking to the outside during the sanding work.

10. The automatic vehicle body sanding system of claim 1,
wherein the robot is configured to replace an aged sandpaper with a new sandpaper by positioning the sanding tool at a home position of the sandpaper recovery machine and the sandpaper supply machine at a time for replacement of the sandpaper.

11. The automatic vehicle body sanding system of claim 10, wherein:
the sandpaper supply machine comprises:
a cylindrical housing including a suspension rod vertically fixed therein;
a suspension plate configured to load the new sandpaper on its upper surface while being penetrated by the suspension rod;
a proximity sensor installed at a predetermined supply position and configured to detect a sandpaper positioned on the uppermost layer of the suspension plate; and
a linear actuator installed to be able to move the suspension plate up and down to raise the suspension plate to a position detected by the proximity sensor when supplying the sandpaper.

12. The automatic vehicle body sanding system of claim 1, wherein:
the server comprises:
an external interface unit comprising wire/wireless communication means for communication with a surrounding equipment;
a scan processing unit configured to create a first matched image obtained by correcting a position error of the vehicle body by matching the 3D scan data with the 3D vehicle body drawing shape on the simulator;
a robot teaching unit configured to match the 3D vehicle body drawing to the first matched image and process the first matched image into a second matched image on which a defective position of the vehicle body is displayed;
a database configured to store various programs and data for automatic vehicle body sanding control; and
a controller configured to control the sanding work of the robot in a normal direction in consideration of a surface angle of the defective position through the 3D robot path.

13. The automatic vehicle body sanding system of claim 12, wherein:
the scan processing unit is configured to transform 3D scan reference coordinates corresponding to a feature point of the 3D scan data into reference coordinates based on the sanding system applied to the 3D vehicle body drawing shape.

14. The automatic vehicle body sanding system of claim 12, wherein:
the robot teaching unit is configured to transform 3D coordinates corresponding to the defective position into reference coordinates of the sanding system to identify the defective position on the second matched image.

15. The automatic vehicle body sanding system of claim 12, wherein:
the controller is configured to adjust pressure applied by the sanding tool and sanding RPM of the sanding tool using the robot according to a defect type or defect level of the defective position during the sanding work, and replace the sandpaper with a sandpaper of a predetermined roughness.

* * * * *